United States Patent [19]

Knapp

[11] 3,769,671

[45] Nov. 6, 1973

[54] MANUFACTURE OF RINGS FOR ROLLING BEARINGS

[75] Inventor: Edward Ronald Knapp, Duston, England

[73] Assignee: The Timken Company, Canton, Ohio

[22] Filed: Nov. 22, 1971

[21] Appl. No.: 201,100

[52] U.S. Cl.... 29/148.4 R, 29/DIG. 18, 29/DIG. 26, 29/DIG. 32
[51] Int. Cl............................. B23p 11/00, B21h 1/12
[58] Field of Search............... 29/148.4 R, DIG. 32, 29/DIG. 26, DIG. 18

[56] References Cited
UNITED STATES PATENTS

| 2,913,811 | 11/1959 | Benson | 29/148.4 R |
| 3,378,903 | 4/1968 | Cardillo | 29/148.4 R |
| 3,382,693 | 5/1968 | Rozhdestvensky et al. | 72/87 |

Primary Examiner—Thomas H. Eager
Attorney—Edward A. Boeschenstein et al.

[57] ABSTRACT

A method of manufacturing rings for rolling bearings, particularly tapered roller bearings, in which a ring of rectangular section made by a hot rolling operation is subjected to cold forming by impact whereby to produce a ring form of non-rectangular section having substantially the shape of the required bearing rings. The ring form so produced is machined on one circumferential face to form the race and on one end, preferably the narrower end, to control the axial length, and may then be hardened.

8 Claims, 2 Drawing Figures

MANUFACTURE OF RINGS FOR ROLLING BEARINGS

BACKGROUND OF THE INVENTION

This invention relates to the manufacture of rings for rolling bearings particularly tapered roller bearings.

It is known to produce bearing rings by cold forming a fully machined rectangular section ring such as might be produced from a piece of tube or bar stock. In this case the resultant bearing ring form may be a single ring or a multiplex form which is subsequently separated into two or more bearing ring forms which requires only partial machining after cold forming.

It is also known to produce bearing ring forms by hot-rolling, mostly in two or more operations, to approximately the desired bearing profile, but this method entails an all over machining process after hot-rolling to produce the "green" or unhardened form of the ring.

It can be said that one of the main differences in the application of the two foregoing methods is one of size, insofar as the method defining the hot-rolled ring is restricted downwards to about 4 inches and upwards to about 20 inches in diameter, whereas the cold forming method is restricted downwards not at all, and upwards normally to about 6 or 8 inches in diameter.

A large number of bearings are required by the heavy transport industry, notably the railways, and in general it could be said that the size range for this class of bearing is in the order of 7½ to 10½ inches in outside diameter.

The advantages proceeding from a cold forming by impact process are as follows:

The after machining required to produce a green or unhardened bearing ring is limited to substantially one circumferential surface and one end face.

The material is densified and the fatigue life of a bearing produced from cold formed rings is extended.

There is some saving in the quantity of material required to make a cold formed bearing ring, as compared with other processes.

Cold forming is quick and accurate and the manufacturing scrap from the process is practically nil.

The hot rolling of rings as performed on modern machines is a quick and fairly accurate method of producing ring shaped mechanical elements, but if it is desired that one of the diameters in particular should be held to a close tolerance, it is conventional to pass the ring whilst still hot, either through a sizing die to control the outside diameter, or over a sizing plug to control the inside diameter.

This is sometimes necessary on account of the manner in which the ring is to be held or chucked, or according to where it is desired that any excess stock may be accommodated.

The direction of fibre flow in hot-rolled rings is in general that which is desirable in bearing rings.

SUMMARY OF THE INVENTION

It is an object of the present invention to provide an improved method of making a bearing ring which combines the advantages of a hot rolled ring with those provided by a cold forming operation.

A further object of this invention is to provide a method of producing a bearing ring from hot-rolled ring stock by an impact operation carried out substantially at room temperature.

In the improved method of manufacturing a bearing ring according to this invention a hot rolled ring of rectangular section is subjected to cold forming by impact whereby to produce a ring form of non-rectangular section having substantially the shape of the required bearing ring. Such a ring form may then need machining only on one circumferential face to form the race and on one end, preferably the narrower end, to control the axial length.

Preferably, prior to cold forming, the hot rolled ring is machined on that circumferential face which does not form the race surface, and on one end, preferably that end which after cold forming is the broader end. This provides for the accomplishment of a suitable surface finish on the surfaces of the cold formed ring form and the machining also enables the weight of the ring to be controlled prior to the cold forming operation.

When necessary the hot rolled ring may be hot sized prior to machining and to cold forming, to control the diameter of that circumferential face on which the race is subsequently formed.

DESCRIPTION OF THE DRAWINGS

In order that the invention may be clearly understood the improved method will be described with reference to the accompanying drawings in relation to the manufacture of the cone and cup of a tapered roller bearing, FIG. 1 being a diagrammatic sketch of a cold form extrusion die of a conventional kind, showing in full line a hot-rolled ring prior to extrusion and in dotted line an extruded cold formed bearing cone, and FIG. 2 being a diagrammatic sketch of a cold form extrusion die of a conventional kind, showing in full line a hot-rolled ring prior to extrusion, and in dotted line an extruded cold formed bearing cup.

DETAILED DESCRIPTION

Figure 1:
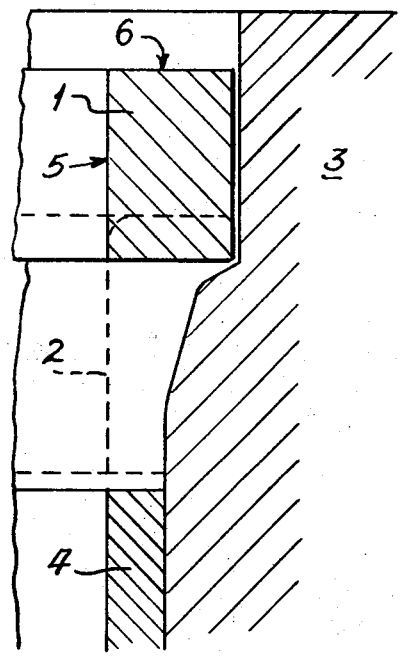

In FIG. 1 there is shown as an axial half section an extrusion die 3 with a knock-out sleeve 4. A hot-rolled ring 1 which has been previously hot sized on the outside diameter and has also been machined on the inside diameter 5 and the uppermost face 6 is shown positioned in the die.

The cold formed cone 2 is shown in dotted line after the operation of the extrusion punch (not shown) and immediately prior to the operation of the knock-out sleeve 4 which pushes the extruded cone out of the die. This forwards extrusion operation is as such conventional.

In this aspect the invention is seen as consisting in the use as a workpiece of a hot sized hot-rolled ring 1 which has been machined only on two surfaces, that is to say those surfaces which represent the inside diameter and the broader face of the extruded cone. The importance of this is that the inside diameter and the broad face of the cold formed extruded cone 2 then need no further machining. The extruded cone 2 is made ready for heat treatment by machining only the outside profile to provide the required race shape and the narrower end face to provide the required length.

Figure 2:
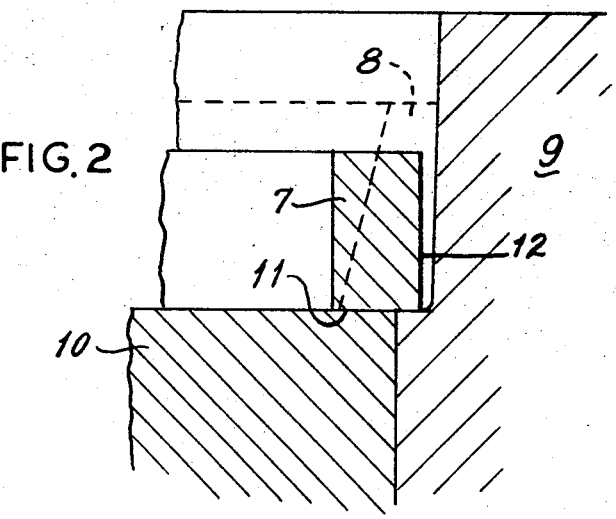

In FIG. 2 there is shown as an axial half section an extrusion die 9 with a knock-out plug 10 which also forms the base of the die.

A hot-rolled ring 7, which has been previously hot sized on the inside diameter and has also been machined on the outside diameter 12 and the lowermost face 11, is shown positioned in the die.

The cold formed cup 8 is shown in dotted line after the operation of the extrusion punch (not shown) and immediately prior to the operation of the knock-out plug 10 which pushes the extruded cup out of the die. This backwards extrusion operation is as such conventional.

In this aspect the invention is seen as consisting in the use as a workpiece of a hot sized hot-rolled ring which has been machined only on two surfaces, that is to say those surfaces which represent the outside diameter and the broader face of the extruded cup 8. The importance of this is that the outside diameter and the broader face of the cold formed extruded cup 8 then need no further machining. The extruded cup 8 is made ready for heat treatment by machining only the inside profile to provide the required race shape and the narrower end face to provide the required length.

The improved method of the invention provides a novel and simple method of making bearing rings which is economical both in material and time. The method may be applied to the manufacture of most types of bearing rings and in a range of sizes of the order of from 4 to 20 inches in diameter.

What is claimed is:

1. The method of manufacturing a bearing ring in which a ring of rectangular section formed by hot rolling is subjected to cold forming by impact whereby to produce a ring form of non-rectangular section having substantially the shape of the required bearing ring, and in which the ring form is machined on one circumferential face to form the required race and on one end to control the axial length.

2. The method of manufacturing a bearing ring in which a hot-rolled ring of rectangular section is machined on that circumferential face which will not form the race surface and on one end, and in which the ring of rectangular cross-section is thereafter subjected to cold forming by impact whereby to produce a ring form of non-rectangular section having substantially the shape of the required bearing ring.

3. The method claimed in claim 2, in which the ring form is tapered in section, and in which the end machined prior to cold forming is that end which after cold forming is the broader end.

4. The method claimed in claim 2, in which prior to machining and cold forming the hot-rolled ring is hot sized to control the diameter of that circumferential face on which the race is subsequently formed.

5. A method for converting a hot-rolled ring of rectangular cross-section into a bearing ring having a race thereon, said method comprising: cold forming the hot-rolled ring to produce a ring form of non-rectangular shape substantially in the configuration of the bearing ring, and machining only one circumferential face of the ring form to the proper size and configuration.

6. A method according to claim 5 and further characterized by machining one end of the ring form until the ring form possesses the proper axial dimension.

7. A method according to claim 5 wherein the one circumferential face is machined to form the race on the bearing ring.

8. A method according to claim 7 wherein the cold forming produces a ring form of tapered section, and wherein the tapered ring form is machined on its narrower end until the ring form possesses the proper axial dimension.

* * * * *